(12) United States Patent
Walker et al.

(10) Patent No.: US 6,477,513 B1
(45) Date of Patent: Nov. 5, 2002

(54) METHOD AND APPARATUS FOR EXECUTING CRYPTOGRAPHICALLY-ENABLED LETTERS OF CREDIT

(75) Inventors: Jay S. Walker, Rigefield, CT (US); Bruce Schneier, Minneapolis, MN (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 08/832,832

(22) Filed: Apr. 3, 1997

(51) Int. Cl.[7] .............................................. G06F 17/60
(52) U.S. Cl. ............................ 705/76; 705/53; 705/75
(58) Field of Search ............................... 705/1, 35, 39, 705/50, 53, 51, 67, 74, 76, 78, 38, 44; 380/1–59, 200–287; 713/155–157, 170, 175

(56) References Cited

U.S. PATENT DOCUMENTS

| | | | |
|---|---|---|---|
| 5,323,315 A | 6/1994 | Highbloom | 705/38 |
| 5,453,601 A * | 9/1995 | Rosen | 705/65 |
| 5,557,518 A * | 9/1996 | Rosen | 705/74 |
| 5,642,419 A * | 6/1997 | Rosen | 705/76 |
| 5,659,616 A * | 8/1997 | Sudia | 705/76 |
| 5,677,955 A * | 10/1997 | Doggett et al. | 705/1 |
| 5,694,552 A * | 12/1997 | Aharoni | 705/37 |
| 5,717,989 A | 2/1998 | Tozzoli et al. | 705/37 |
| 5,790,677 A * | 8/1998 | Fox et al. | 705/78 |
| 5,850,442 A * | 12/1998 | Muftic | 705/76 |
| 5,903,652 A * | 5/1999 | Mital | 705/78 |
| 5,903,882 A * | 5/1999 | Asay et al. | 705/76 |
| 5,915,022 A * | 6/1999 | Robinson et al. | 705/75 |
| 5,987,140 A * | 11/1999 | Rowney et al. | 705/79 |
| 6,006,199 A * | 12/1999 | Berlin et al. | 705/26 |
| 6,029,150 A * | 2/2000 | Kravitz | 705/74 |
| 6,253,322 B1 * | 6/2001 | Susaki et al. | 705/67 |

FOREIGN PATENT DOCUMENTS

WO    WO-98/49658 A1 * 11/1998

OTHER PUBLICATIONS

"The Role of the Trusted Third Party", Abstract, Financial Technology Insight, Journal, Apr. 1994.*
Anonymous, "Companies Need Certificate Interoperability—Certificate Authorities Positioning to Instill Peace of Mind", Electronic Commerce News, vol. 2, No. 13, Mar. 31, 1997.*
Karve, Anita, "Lesson 104, Public Key Cryptography", LAN Magazine, vol. 12, No. 4, Apr. 1997.*
Gierkink, Tia, "Mainspring Case–In–Point: Royal Bank of Canada International Trade Services," Financial Services, Mainspring Communications, Inc., pp. 33–41, Sep. 1998 (Copyright 1998).
C. Dugas, Love and Money: Balancing a Marriage and Finances Doesn't Happen by Accident—You Have to Work at it, Newsday (Jul. 9, 1995).
Z. Milosevic and A. Bond, "Electronic Commerce on the Internet: What is Still Missing?", Nov. 7, 1996.
Sovicklan and R.A. Brundage McCutchen Communications Industry Group, "Enforcing The Electronic Contract," Nov. 7, 1996.
Digital ID FAQ, FAQ: Answers About Today's Digital IDs, Version 1.1, Jul. 15, 1995.

(List continued on next page.)

Primary Examiner—James P. Trammell
Assistant Examiner—John W. Hayes
(74) Attorney, Agent, or Firm—Dean P. Alderucci

(57) ABSTRACT

A method and apparatus for executing electronic transactions using cryptographically-enabled accounts stores cryptographically-enabled account information and instructions, receives a cryptographically-encoded permission certificate, and processes the received permission certificate to execute the transactions.

1 Claim, 18 Drawing Sheets

OTHER PUBLICATIONS

Advanced RSA Security Technology Enables Wholesale Banks to Conduct Business with Customers on.

Individual Inc, "Banc One to Use Open Market Software For Corporate Cash Management Services Over the Internet," 1995.

M. Galland, "Legal Aspects of a Paperless Letter of Credit," Dec. 6, 1994.

D. Kaplan, "Surities Keep Borrowing Costs Down as Internet Rates Rise," The Bond Buyer, May 29, 1996.

"California Court Rules Escrow Accounts Must Be 'Terminable'," Thomson Publishing Corp., Jun. 24, 1996.

Crain Communications Inc., "Letters of Credit Can Be Counterproductive," Sep. 11, 1995.

Bank Marketing Association, "Imperial Bank Encourages Safe Checking," Dec. 1994.

"Security First, The On–Line Bank, Adds to Offerings," The American Banker, Feb. 12, 1996.

"Making the Banking Connection; What to Look For in Online Financial Management," Chicago Sun–Times, Inc., Nov. 12, 1995.

* cited by examiner

| AUTHORIZATION NUMBER 602 | PARTY NAME 604 | PARTY ADDRESS 606 | CERTIFICATE TYPE 608 | START DATE 610 | EXPIRATION DATE 612 | CONDITIONS 614 | STATUS 616 | AMOUNT 618 |
|---|---|---|---|---|---|---|---|---|
| 001 | BILL (BUYER) | BILL@ ABC.COM | BALANCE | 11/1/96 | 12/30/96 | CONTRACT SIGNED | PENDING | 100% |
| 002 | BILL (BUYER) | BILL@ ABC.COM | LOCK ACCOUNT | 11/1/96 | 11/30/96 | CONTRACT SIGNED | ISSUED | 100% |
| 003 | SALLY (SELLER) | SALLY@ EXY.COM | BALANCE | 11/1/96 | 12/30/96 | CONTRACT SIGNED | COMPLETED | 100% |
| 004 | SALLY (SELLER) | SALLY@ EXY.COM | LOCK ACCOUNT | 11/30/96 | 12/30/96 | CONTRACT SIGNED | COMPLETED | 50% |
| 005 | TRENT (TRUSTED AGENT) | TRENT@ TA.COM | LOCK ACCOUNT | 11/1/96 | 12/30/96 | CONTRACT SIGNED | COMPLETED | 100% |
| 006 | TRENT (TRUSTED AGENT) | TRENT@ TA.COM | WITHDRAWAL | 11/30/96 | 12/30/96 | VERIFICATION 007 | COMPLETED | 100% |
| 007 | VICTOR (VERIFICATION AUTHORITY) | VICTOR@ VA.COM | VERIFICATION | 11/30/96 | 12/30/96 | GOODS DELIVERED | PENDING | 0% |
| 008 | TRENT (VERIFICATION AUTHORITY) | TRENT@ TA.COM | PARTIAL WITHDRAWAL | 11/30/96 | 11/15/96 | VERIFICATION 009 | COMPLETED | 20% |
| 009 | VERONICA (VERIFICATION AUTHORITY) | VERONICA@ VA.COM | VERIFICATION | 11/1/96 | 12/30/96 | GOODS COUNT ACCURATE | ISSUED | 0% |

| CERTIFICATE NUMBER 702 | CERTIFICATE CODE 704 | CERTIFICATE TYPE 706 | EXPIRATION DATE 708 | CONDITIONS 710 |
|---|---|---|---|---|
| 135-6721 | 135-6721.KEY | BALANCE | 12/30/96 | PENDING |
| 135-6722 | 135-6722.KEY | LOCK ACCOUNT | 11/30/96 | ISSUED |
| 135-6723 | 135-6723.KEY | WITHDRAWAL | 12/30/96 | COMPLETED |

FIG. 7

| ACCOUNT NUMBER 902 | HOLDER NAME 904 | HOLDER ADDRESS 906 | BALANCE 908 | STATUS: (LOCKED, UNLOCKED, CLOSED) 910 | LAST CHANGED BY PUBLIC KEY NUMBER 912 | DATE LAST CHANGED 914 |
|---|---|---|---|---|---|---|
| 9611012753A | BILL | BILL@ABC.COM | $10,000 | UNLOCKED | 127.KEY | 2/1/96 |
| 9611072317 | TOM | TOM@PDQ.COM | $25,000 | LOCKED | 138.KEY | 11/15/96 |

METHOD AND APPARATUS FOR EXECUTING CRYPTOGRAPHICALLY-ENABLED LETTERS OF CREDIT

BACKGROUND OF THE INVENTION

The present invention relates to information systems and methods, and more particularly to information systems facilitating financial transactions involving escrow accounts.

Financial transactions involving escrow accounts, such as letters of credit ("LC"), are well known commercial transactions that provide a valuable service for domestic and international trade. An LC is a commercial contract between two parties (a buyer and a seller) in which one or more banks serve as trusted agents to secure and facilitate the transaction.

Tracing the steps in a typical LC illustrates how financial transactions using similarly structured escrow accounts are conducted. A typical LC involves a U.S. company (the buyer) that wants to purchase 100,000 widgets for $1 million from a supplier in Germany (the seller) on net 90-day delivery terms. Both the buyer and the seller use local U.S. and German banks. In order to fulfill the order, the seller needs to finance the raw materials and labor to produce the widgets. The seller presents a signed purchase order from the U.S. company to their local German bank to borrow $750,000. The terms of the sale provide, for example, net 90 day payment after delivery.

The German bank wants to lend the $750,000 to the German supplier, but is not confident of the creditworthiness of the U.S. company and worries that the U.S. company might change its mind and reduce the order size before delivery is made. The German bank is, however, confident that the German company can deliver the widgets. The bank informs the German supplier that unless the American company either pays 50% in advance or provides an absolutely reliable guarantee of payment and non-cancellability (either from the U.S. company or some trusted third party), the German bank cannot lend the German company the $750,000 it needs. The German company notifies the American company of the problem.

The American company in turn communicates its predicament to their local bank in the U.S. They explain that they do not want to pay the German supplier 50% in advance because they are uncertain as to the financial strength of this new supplier and have some concerns as to whether the supplier will be able to deliver on the widget contract as set forth in the purchase order. The American company then asks whether the bank might be willing to serve as a trusted intermediary to facilitate the transaction.

The American bank creates a special form of a contract called an irrevocable LC, which acts as an irrevocable promise by one bank to remit money to another party ( e.g. a bank in a foreign country) under certain terms and conditions. In this example, the American bank agrees to pay the German bank $1 million 90 days after 100,000 widgets are received at a specified warehouse in New York, so long as the widgets have been inspected and approved by an independent inspector as adhering to the quality standards set forth in the purchase order.

To secure the LC, the American bank requires the American company to place $1 million in an interest-bearing escrow account at the American bank. The American company cannot withdraw this money except under certain pre-agreed circumstances, such as a release of the LC by the German bank. The American bank charges the buyer a fee for setting up the LC, typically 1% of its value. There may also be other associated charges. With an LC from a recognized and trusted American bank, the German bank is confident that so long as the widgets are delivered as promised, they are sure to get paid per the agreed-upon terms i.e. 90 days from delivery. They are also sure that should a dispute arise, a trusted, independent third party (the American bank) will seek to resolve the problem and that the money will remain in escrow until such resolution is completed. On this basis, the German bank lends $750,000 to the German supplier and commerce between two wary parties in two different countries takes place smoothly.

In some cases, the money in the escrow account which secured the LC is not paid to the seller's bank. Instead, it acts as a security bond (a form of insurance) such that if the American company does not pay the German company on time, the German bank may seek to enforce the LC and claim all or part of the money in the escrow account.

An LC often involves large multinational intermediary banks or trading companies since most smaller banks do not have direct or ongoing relationships with foreign banks. These intermediary institutions regularly sell LC services to other banks and are referred to as corresponding or agent banks.

A typical LC has the following components:
1. The terms of the sale (usually a written contract)
2. A buyer
3. The buyer's trusted financial agent (usually a bank)
4. The buyer's escrow account (or an insurance bond)
5. A seller
6. The seller's trusted financial agent (usually a bank)
7. An independent arbiter of contract fulfillment
8. Trusted banking/legal authorities for assured performance and dispute resolution 1. The Terms of Sale This is the contract that governs the transaction. It is typically fixed in advance though the price can be left open based on an agreed formula such as the prevailing price on a specified exchange at the time of delivery. Contracts set forth all of the relevant terms and conditions. They typically cannot be canceled or repudiated except under very specific conditions.

2. A Buyer

A buyer is usually the recipient of specific goods. Though LC's almost always have a specified buyer and seller, it is possible that the buyer is also a seller, for example, in a transaction where the buyer also agrees to sell something to the seller. Also, commodity barter deals blur the distinction between buyer and seller (e.g., 10,000 tons of coal are bartered for 1 million gallons of oil).

3. A Buyer's Trusted Financial Agent

This trusted agent is typically a bank, but any third party with the ability to issue a promise acceptable to the seller (or the seller's financial agent) can serve this role. For example, Japanese trading companies often issue LC's.

4. The Buyer's Escrow Account

To prevent a buyer from reneging, the buyer's financial agent usually requires that the buyer place the total face value of the LC in an inaccessible escrow account. This form of security deposit does not have to be liquid. It could be government bonds, marketable securities or any other form of value which is acceptable to the issuing bank, including a portion of the company's active credit line that is segregated and pledged as security for the LC.

5. Seller

A seller is the other major party to the transaction. In some cases the seller is the direct beneficiary of the LC. In other cases it is the seller's financing agent.

6. A Seller's Trusted Financial Agent

This trusted agent is typically a bank, but it can be any party. Usually it is the party or parties that are financing the seller's ability to complete or deliver the contract.

7. An Independent Arbiter of Contract Fulfillment

This is the party empowered to declare that the delivery terms of the contract have been fulfilled. This party is almost always independent of all of the other parties and is trusted by all parties. There may also be more than one of these parties in any given transaction. For example, for imported meat, the product must clear customs and be approved by the U.S.D.A. as meeting its standards of quality. In some cases, where there is no significant quality component to the contract fulfillment, such as the purchase of 1,000 tons of gravel, a simple bill of lading to a seller's ship can suffice as proof of delivery.

8. Trusted Banking and Legal Authorities for Assured Performance and Dispute Resolution The entire LC system would not function if not for the parties' mutual confidence in the reliability of the legal and banking regulatory superstructure found in industrialized countries. This superstructure assures each party to an LC that the banks or financial institutions involved will behave predictably, responsibly and expeditiously. All parties are aware that banks will follow established regulations and laws for which there are both substantial and probable penalties for willful violation. And all parties understand that there is clear legal recourse should any party act in bad faith or in a fraudulent manner.

Methods and systems currently used for these transactions are complex, expensive, and often time-consuming to set up and administer. As such, they are currently used only by companies engaged in substantial international trade. A need exists to simplify the process, reduce the associated costs, and allow individuals and small companies simple and practical access to the benefits of these transactions in both international and domestic transactions.

A buyer's flexibility in LC transactions is limited because the buyer must have a pre-established banking relationship. Thus, it is difficult to shop around or create ad hoc LC's. The buyer's bank must be willing and able to set them up, and many banks are not capable of doing so. Others will only issue certain types of LC's. Also many current systems require that the buyer, seller, and bank know the identity of the seller in order to create an LC. Moreover, the cost and fees associated with LC's are often very high, especially relative to smaller value transactions. To provide a buyer with greater flexibility in LC transactions, the buyer would prefer that banks issue LC's through any large or trusted company, such as a Fortune 500 supplier, insurance company, or investor.

Other examples of transactions involving escrow accounts include real estate escrow accounts administered by attorneys serving as trusted third parties. A seller who enters into a contract to sell real estate to a buyer will often require that the buyer demonstrate that it is capable of financing the transaction and that certain penalties or other monies (such as tax payments due) are set aside in escrow should the transaction call for the payment of such monies. Because attorneys have ongoing reputations that survive the transaction, and because attorneys are well aware of the legal ramifications of violating escrow agreements, two law firms who are unfamiliar with each other will often trust one another even if the parties they are representing do not.

Using available methods and systems for escrow transactions, it is difficult for a foreign seller to help a foreign buyer set up local banking relationships capable of supporting these transactions. The seller and the seller's bank may not have experience with these transactions and thus, even if the buyer can support its end of the transaction, the seller may not have systems compatible with the buyer's systems. Furthermore, in the current environment, banks that would like to accommodate buyers and sellers by offering these transactions may be precluded because of the need for specialized expertise or international affiliate networks.

Other examples of these accounts include numbered and anonymous, "Swiss-style" bank accounts. These accounts are not identified by name, but by number. This allows anonymity of the account's owner, although the bank typically knows the owner's identity. Numbered accounts are designed to allow access to anyone with the number, so the number serves as an unrestricted key to any holder.

SUMMARY OF THE INVENTION

The present invention is directed to a method and apparatus for executing electronic transactions using cryptographically-enabled accounts. An apparatus consistent with the present invention includes structure for storing cryptographically-enabled account information; structure for storing cryptographically-enabled instructions; and structure for receiving a cryptographically-encoded permission certificate. The apparatus also includes structure, connected to both storing structures, for processing the permission certificate and instructions.

A method for automatically executing electronic transactions using a cryptographically-enabled account includes the steps of establishing an acceptable electronic representation of a contract, creating the cryptographically-enabled account according to terms in the contract, distributing cryptographically-encoded electronic permission certificates allowing account access according to terms in the contract, receiving a cryptographically-encoded electronic permission certificate verifying fulfillment of contract terms, and permitting account access responsive to an account access cryptographically-encoded electronic permission certificate.

Both the foregoing general description and the following detailed description are exemplary and explanatory and are intended to provide further explanation of the invention as claimed.

DESCRIPTION OF THE FIGURES

The accompanying drawings provide a further understanding of the invention. They illustrate embodiments of the invention and, together with the description, explain the principles of the invention.

FIG. 6 is an example of records stored in a contract terms database consistent with the present invention;

FIG. 7 is an example of records stored in a permission certificate database consistent with the present invention;

FIG. 9 is an illustration of records in an account database consistent with the present invention;

DETAILED DESCRIPTION OF THE INVENTION

Reference will now be made in detail to the preferred embodiments of this invention, examples of which are illustrated in the accompanying drawings.

Figure 1:
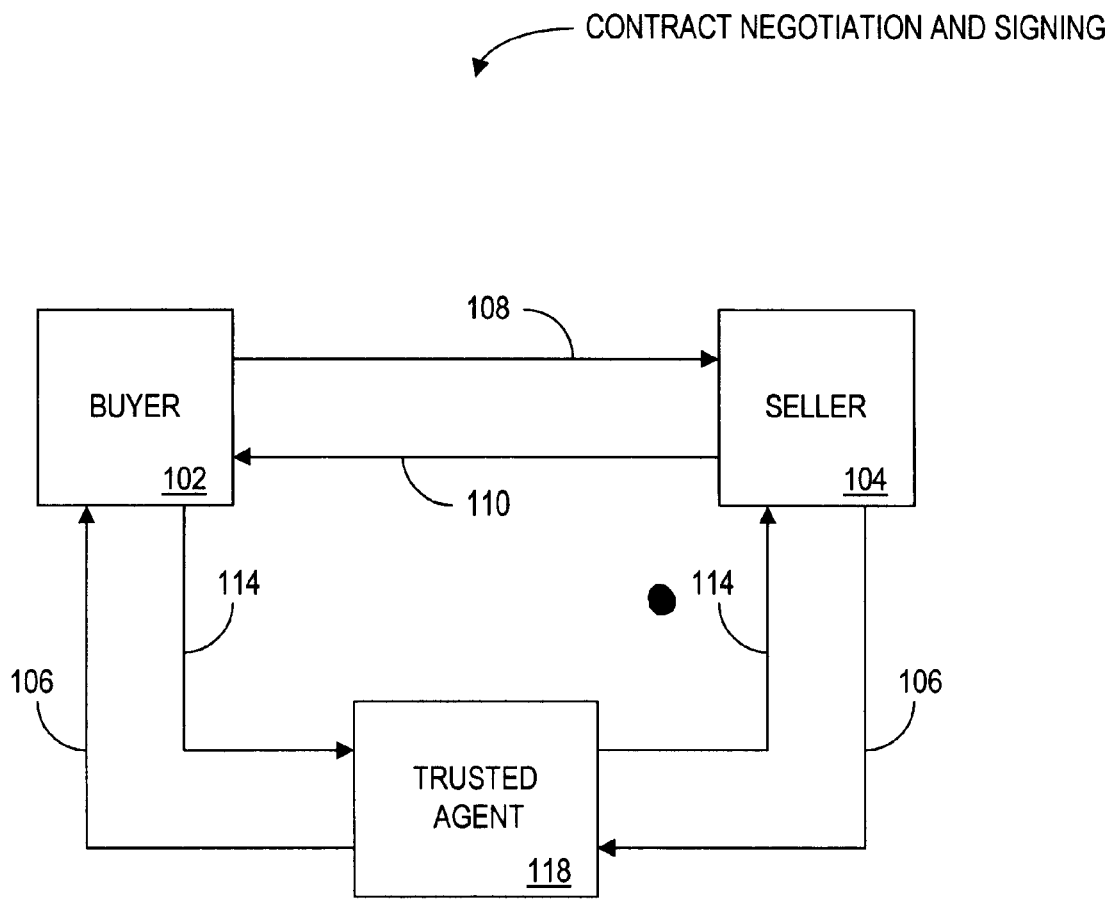
FIG. 1 is a document flow diagram illustrating one possible environment for a method and apparatus consistent with the present invention.

To illustrate the environment of this invention, FIG. 1 is a document flow diagram illustrating one possible scenario using a method and apparatus consistent with the present invention. The figure depicts a typical transaction in which buyer 102 and seller 104 negotiate and sign a contract. While negotiating terms of the contract, buyer 102 and seller 104 exchange unsigned contracts 108 and 110. Once the buyer and seller agree on the contract terms, buyer 102 digitally signs and transmits contract 114 to trusted agent 118 who forwards the buyer-signed contract to seller 104. Seller 104 accepts and digitally signs the contract, creating buyer and seller-signed contract 106. The seller returns buyer and seller-signed contract 106 to buyer 102 through an agreed upon trusted agent 118, thus closing the agreement. It will be understood that the establishment of the contract as described need not necessarily be electronic. A conventionally signed paper document may be used to establish the signed contract. Further, buyer 102 and seller 104 may negotiate the contract directly, providing only the final signed copy to trusted agent.

It will be noted that subscripts within the drawing indicate the signing or receiving party of the various documents. For example, "CONTRACT$_B$" indicates a contract signed by the buyer, while "CERTIFICATE$_{VAB}$" indicates a certificate distributed to verification authority B. It will further be understood that while subsequent Figures use different reference numbers to describe the various parties, where a unitary transaction occurs, the various parties are the same throughout the different phases of the transaction.

Figure 2:
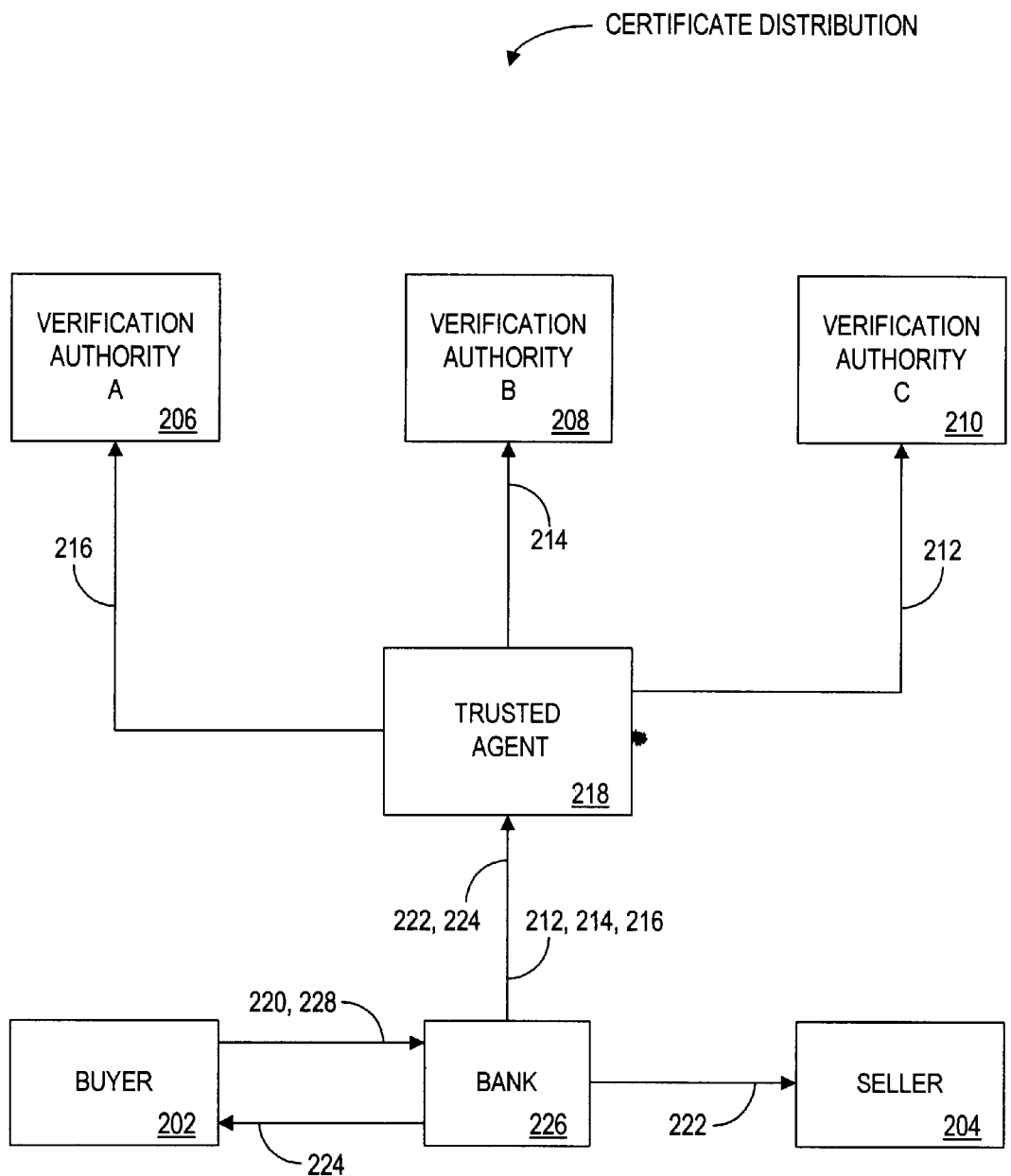
FIG. 2 is a document flow diagram illustrating permission certificate distribution in a financial transaction involving escrow accounts consistent with the present invention.

FIG. 2 is a document flow diagram illustrating permission certificate distribution in a financial transaction involving escrow accounts.

As used herein, term "escrow account" defines the establishment of a value which can not be released except upon the occurrence of the pre-determined contract conditions. The escrow account may be an actual stand-alone account or, as described above, the locking of a portion of a larger account, a line of credit, a bond or other financial document, or the like. Once buyer and seller have executed a contract, buyer 202 sends buyer and seller-signed contract 220 along with any deposit money 228 to bank 226. Bank 226 distributes permission certificates, that verify that there is a valid agreement between the parties and that funds have been allocated in an escrow account for the transaction. As described in detail below, "permission certificate" herein comprises a digital code. The permission certificates go to the parties involved in the transaction, buyer 202, seller 204, verification authorities A through C 206, 208, and 210, respectively, and trusted agent 218. The bank distributes Seller and Buyer permission certificates 222, 224, while trusted agent 218 distributes verification authority permission certificates 212, 214, 216. Verification authorities 206, 208, 210 are responsible for certifying that both buyer and seller adhere to the terms of the contract, for example, by certifying that the goods delivered by seller 204 meet government regulations.

Figure 3:
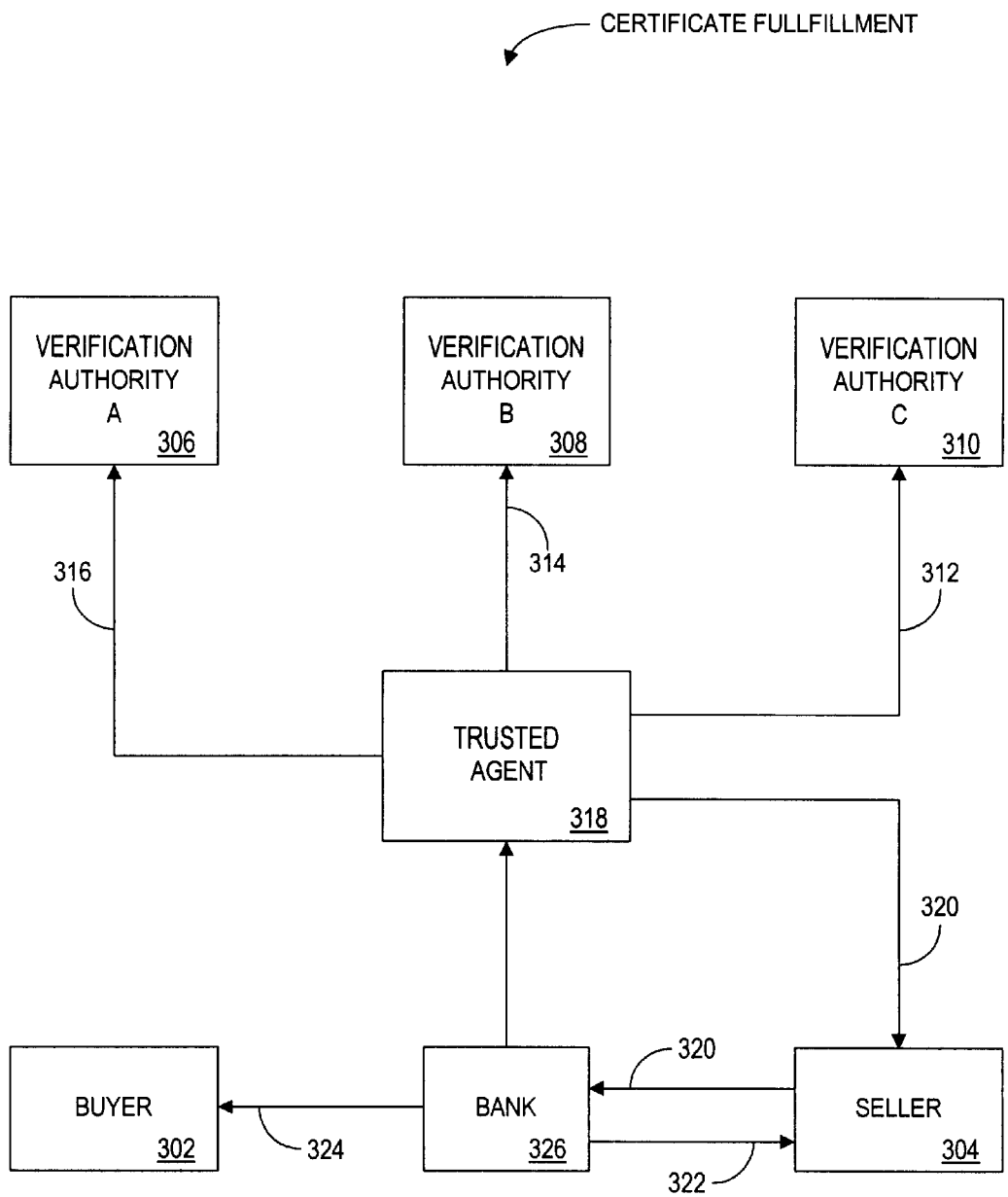
FIG. 3 is a document flow diagram illustrating steps taken when a seller withdraws funds from an escrow account consistent with the present invention.

After performing the terms of the contract, the seller withdraws funds from the escrow account according to a process illustrated in FIG. 3. After verifying that the seller's performance meets the terms of the contract, each verifying authority A, B, and C returns its permission certificate to trusted agent 318. When the verifying authorities return permission certificate 312, permission certificate 314, and permission certificate 316, trusted agent 318 issues withdrawal permission certificate 320 to seller 304. Seller 304 presents this withdrawal permission certificate 320 to bank 326 to receive payment 322 from the bank's escrow account established for this transaction. Bank 326 then sends withdrawal confirmation 324 to buyer 302 completing the transaction.

Practicing principles consistent with the invention, financial institutions can establish standard form cryptographically-enabled accounts (CEA) and software protocols governing such accounts enabling automated negotiations and processing of financial transactions. Such CEA's can be used to facilitate, for example, letters of credit, without the traditional complexity and costs of the prior art. Moreover, with the proper equipment, anyone can log onto a network and set up a transaction using a CEA from their office or home in a matter of minutes. The transaction is secure because it uses cryptographic permission certificates that are easy to generate but extremely hard to forge. The transaction also uses electronic digital signatures that prevent the buyer or seller from altering or repudiating the contract.

Also in these automated transactions, companies can be formed to serve as trusted agents or can add trusted agent services to those they already provide. In all industries where agents facilitate commerce, there is a thriving and competitive marketplace of agents, especially small agents. In addition, insurance companies, brokerage houses and other companies that maintain financial accounts can offer trusted agent services in competition with independent agents and banks. Cryptographically-enabled controllers and methods consistent with the present invention can spur a thriving market of trusted agents that service many cryptographically-enabled domestic and international financial transactions. Where appropriate, banks themselves may also constitute the trusted agents.

A benefit of these cryptographically-enabled accounts is that they can be self-enforcing. If, for example, the seller does not deliver on the deadline established by the contract, the buyer can easily reclaim the money in the account without having to seek a revocation or cancellation of the contract A further benefit of this invention is anonymity of the transacting parties. Anonymity is facilitated in ways not allowed in the prior art. "Blind" CEA's can be set up so that the bank involved has no knowledge of the buyer and/or the seller in the transaction. Anyone who presents the correct permission certificates can operate on the account in a manner consistent with the provisions established for that account.

Figure 4:
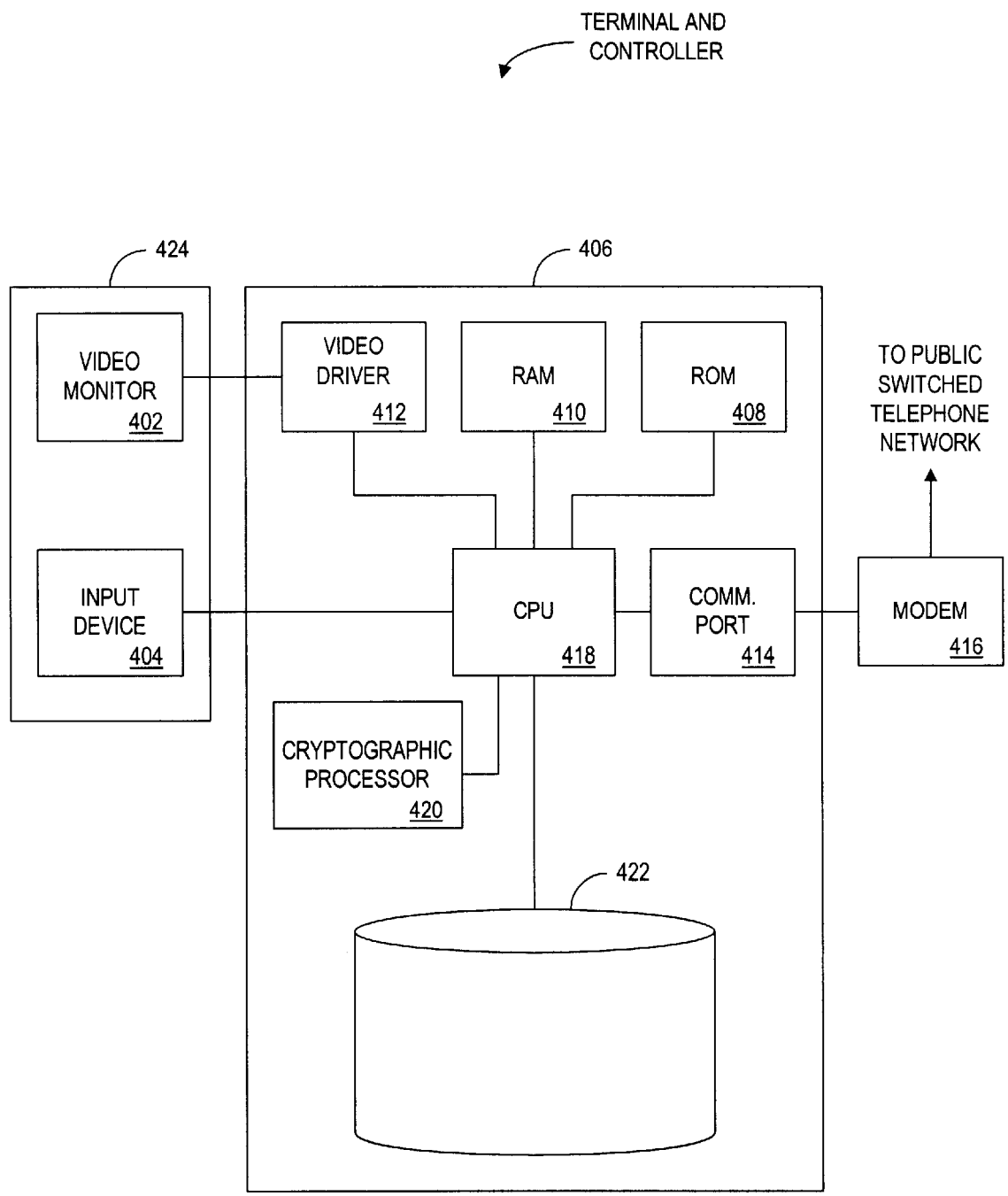
FIG. 4 is a block diagram of a terminal and controller consistent with the present invention.

Methods and apparatus consistent with the present invention are directed to providing an automated cryptographic framework for executing the financial transactions described above. To illustrate the principles of this invention, FIG. 4 shows terminal 424, modem 416, and controller 406. Terminal 424 includes video monitor 402 and input device 404, such as a keyboard and mouse. Cryptographically-enabled controller 406 includes video driver 412, random access memory ("RAM") 410, read only memory ("ROM") 408, central processing unit ("CPU") 418, communications port 414, cryptographic processor 420, and data storage device 422. Video monitor 402 connects to controller 406 through video driver 412 and input device 404 connects to the controller through CPU 418. Modem 416 communicates with another terminal and controller apparatus through a network, such as the public switched telephone network, the Internet, a local area network, or a wide area network. In an embodiment consistent with the present invention, each facility (i.e., buyer, seller, trusted agent, verification authority, and bank) depicted in the flow diagrams of FIGS. 1–3 has access to a terminal and controller pair.

Figure 5:
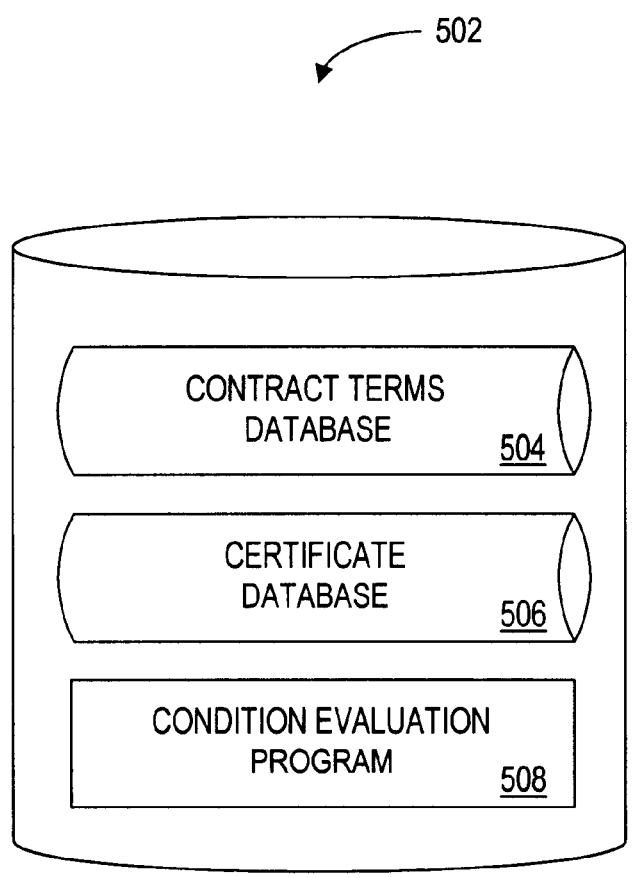
FIG. 5 is a block diagram of a trusted agent controller database consistent with the present invention.

When the terminal and controller pair serves a trusted agent, data storage device 422 contains trusted agent controller database 502 as illustratively shown in FIG. 5. Trusted agent controller database 502 contains contract terms database 504, permission certificate database 506, and condition evaluation program 508.

FIG. 6 is an example of a record stored in contract terms database 504. Included in this record are fields for authorization number 602, party name 604, party address 606, permission certificate type 608, start date 610, expiration date 612, conditions 614, status 616, and amount 618. The contents of each field are self-explanatory. Note, however, that the structure of this table becomes lengthier when the contract terms are complex.

FIG. 7 is an example of a record stored in permission certificate database 506. Included in this record are fields for permission certificate number 702, permission certificate code 704, permission certificate type 706, expiration date 708, and conditions 710. Some or all of the data included in these fields can be stored as encrypted data.

The present invention contemplates many different types of permission certificates, some of which are described in Table 1 below. It will be apparent to those skilled in the art that permission certificate types can be created to match the terms and conditions of any type of contract. The remaining fields are self-explanatory, with their function discussed in further detail below.

TABLE 1

Examples of permission certificates.

| Certificate Type | User | Function |
| --- | --- | --- |
| lock/unlock | trusted agent | lock/unlock an account |
| verification | trusted agent | verify an account existence |
| inquiry/balance | buyer or seller | determine balance/status |
| withdrawal | seller | withdraw account funds |
| partial withdrawal | seller | withdraw account funds |
| deposit | buyer | deposit account funds |
| Partial deposit | buyer | Deposit account funds |
| Expire | buyer | close account |

Figure 8:
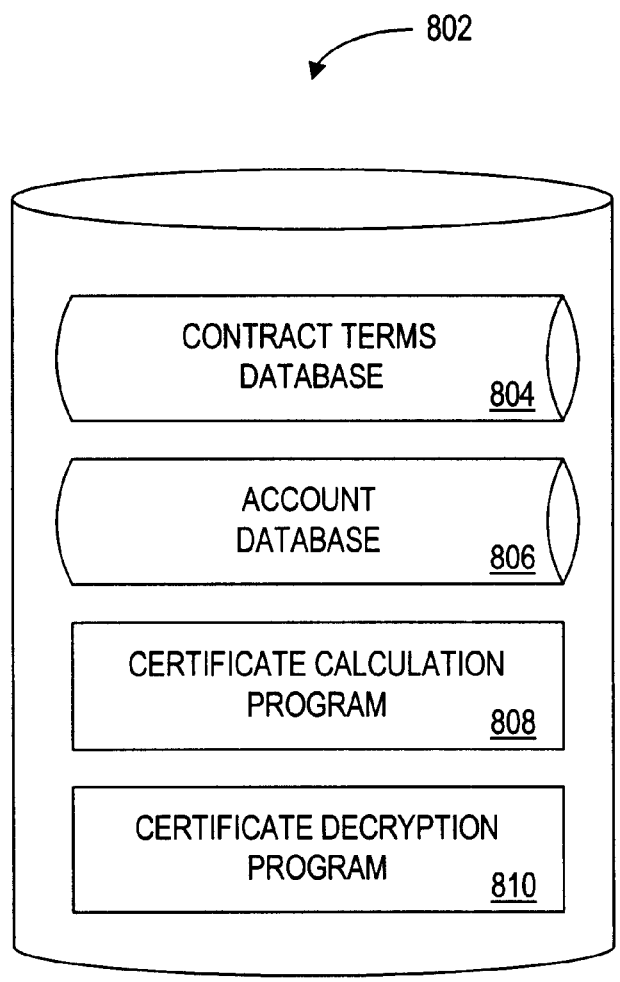
FIG. 8 is a block diagram of a bank controller database consistent with the present invention.

When the terminal and controller pair serves a bank, data storage device 422 contains bank controller database 802 as illustratively shown in FIG. 8. Bank controller database 802 contains contract terms database 804, account database 806, permission certificate calculation program 808, and permission certificate decryption program 810. Contract terms database 804 preferably has the same structure as the contract terms database structure illustrated in FIG. 6.

FIG. 9 is an illustration of the records in account database 806. Account database records include, for example, fields for an account number 902, holder name 904, holder address 906, balance 908, status 910, "last changed by" public key number 912, and date of last change 914. The key corresponding to the "last changed by" public key number field 912 is preferably stored as a file containing 512-bit or larger numbers. The contents of these fields are self-explanatory. The functions of all of the referenced programs are described herein below.

Figure 10:
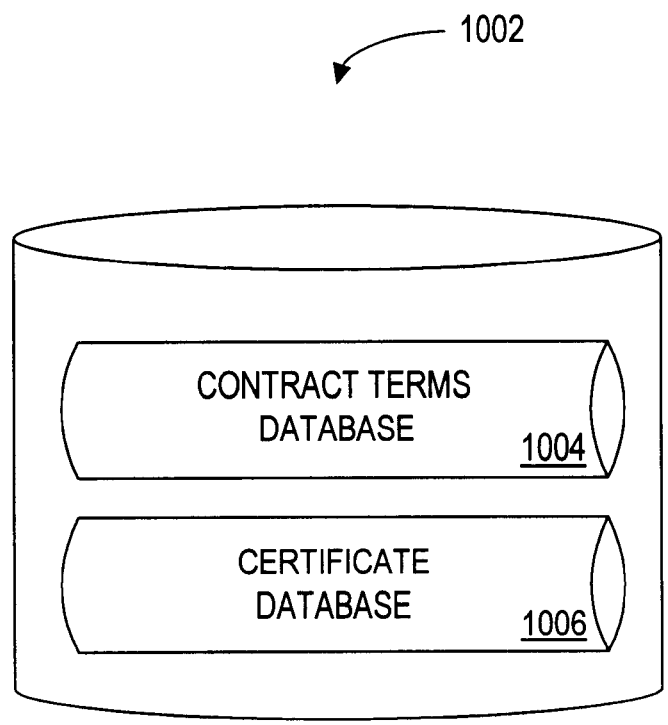
FIG. 10 is a block diagram of a buyer and seller database consistent with the present invention.

When configured for a buyer or seller, terminal and controller pair data storage device 422 contains buyer/seller database 1002 (FIG. 10) including contract terms database 1004 and permission certificate database 1006, each containing records whose structure follows the record structure illustratively shown in FIGS. 6 and 7, respectively.

Figure 11:
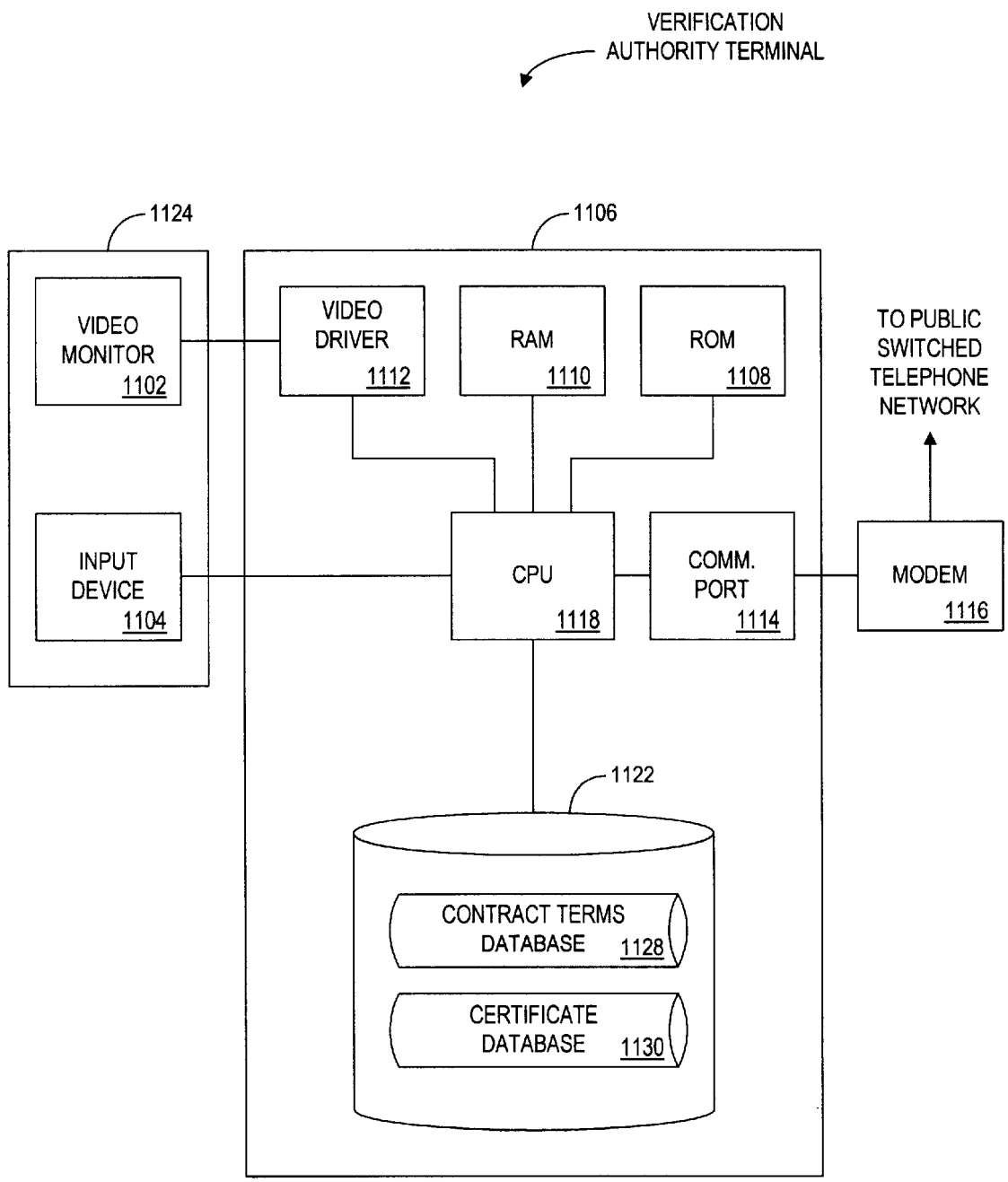
FIG. 11 is a block diagram of a terminal and controller for a verification authority consistent with the present invention.

FIG. 11 shows terminal 1124, modem 1116, and controller 1106 for a verification authority. Terminal 1124 includes video monitor 1102 and input device 1104, such as a keyboard and mouse. Controller 1106 includes video driver 1112, RAM 1110, ROM 1108, central processing unit CPU 1118, communications port 1114, and data storage device 1122. Video monitor 1102 connects to controller 1106 through video driver 1112 and input device 1104 connects to the controller through CPU 1118. To simplify the architecture and to reduce the cost of a controller when configured as a verification authority controller, it need not include a cryptographic processor. Modem 1116 communicates with another terminal and controller apparatus through a network, such as the public switched telephone network. Data storage device 1122 contains contract terms database 1128 and permission certificate database 1130, each containing records whose structure follows the records illustratively shown in FIGS. 6 and 7, respectively.

Figure 12:
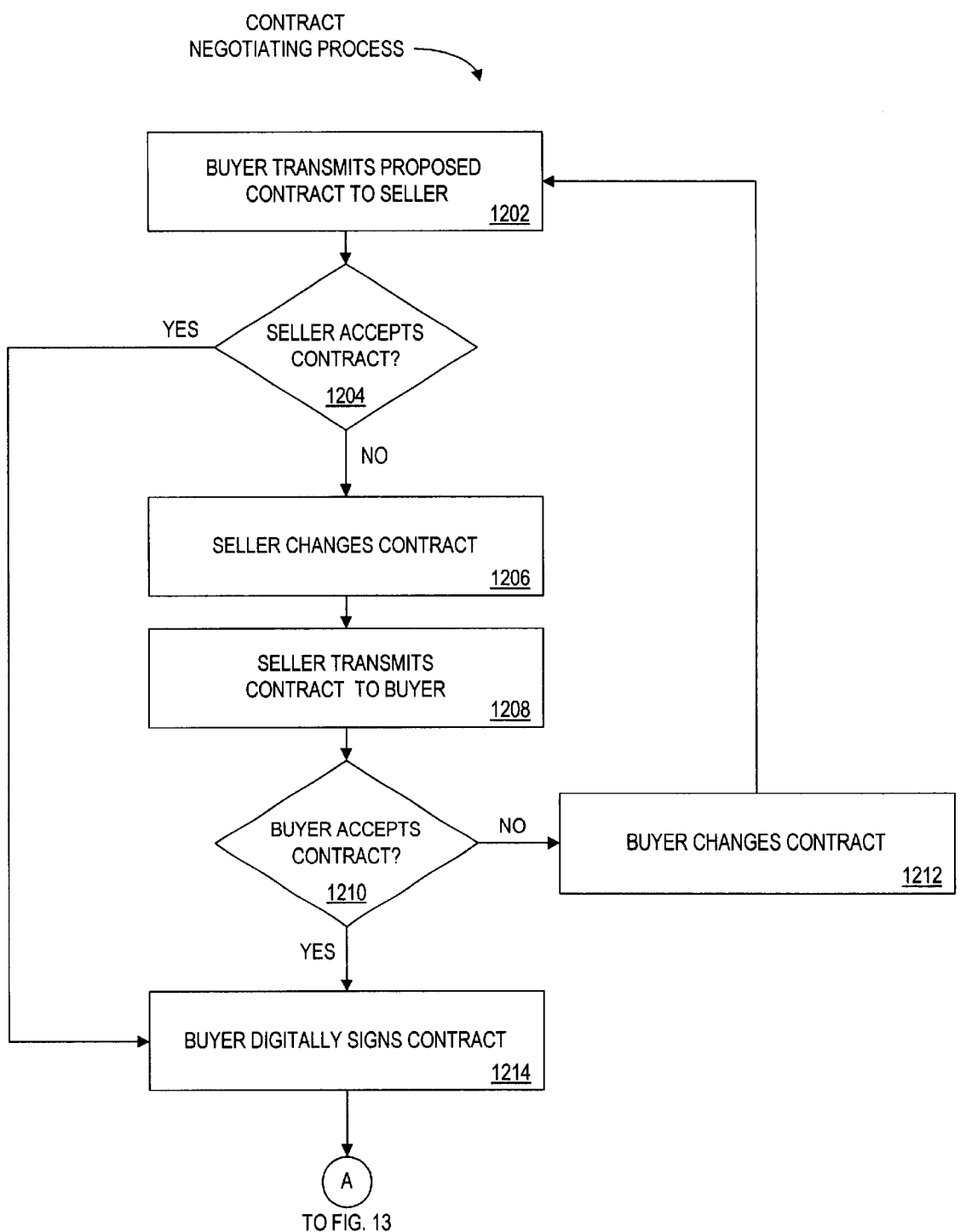
FIG. 12 is a flow diagram of a method for contract signing consistent with the present invention.
Figure 13:
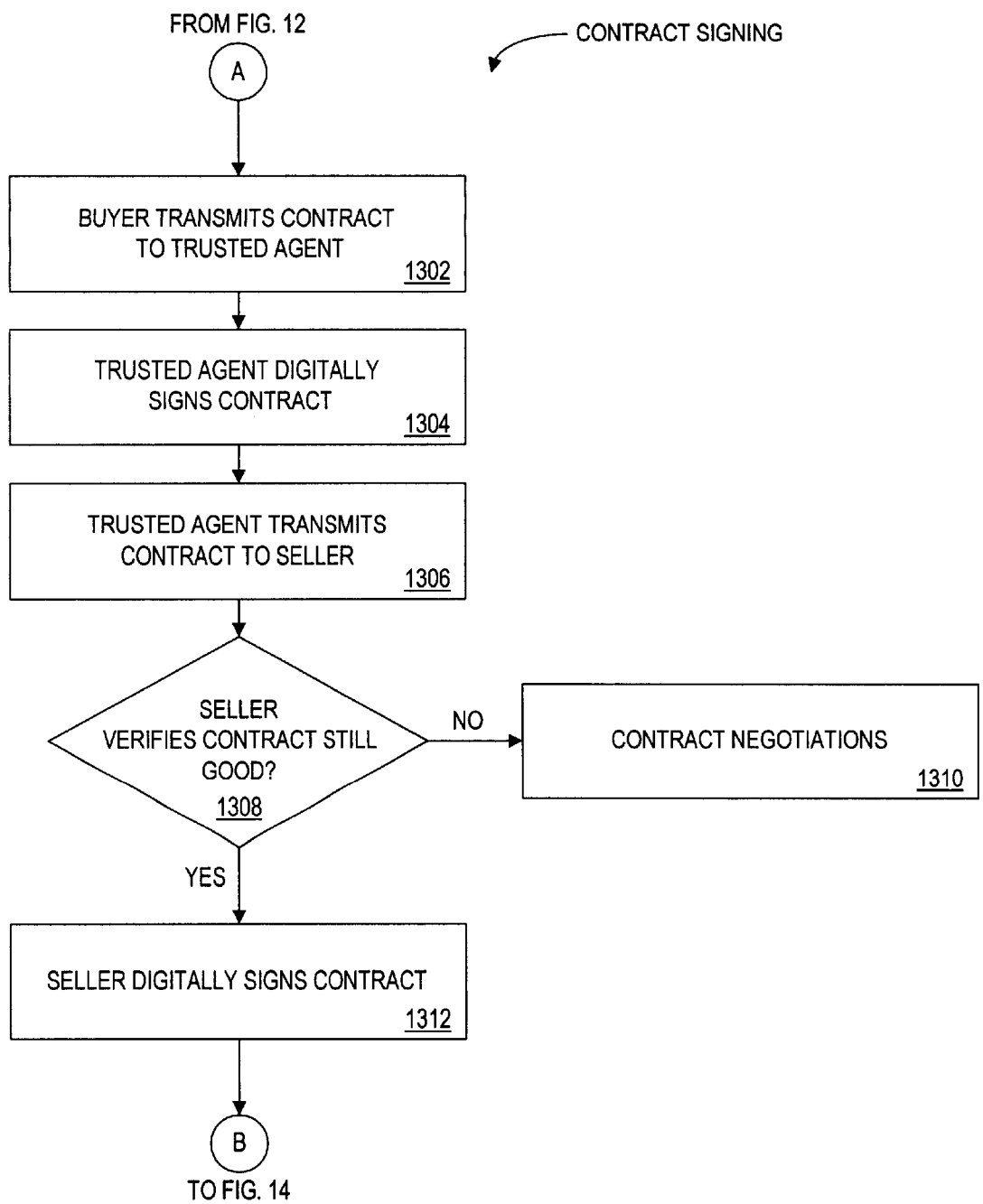
FIG. 13 is a flow diagram of a method for accepting a contract consistent with the present invention.
Figure 14:
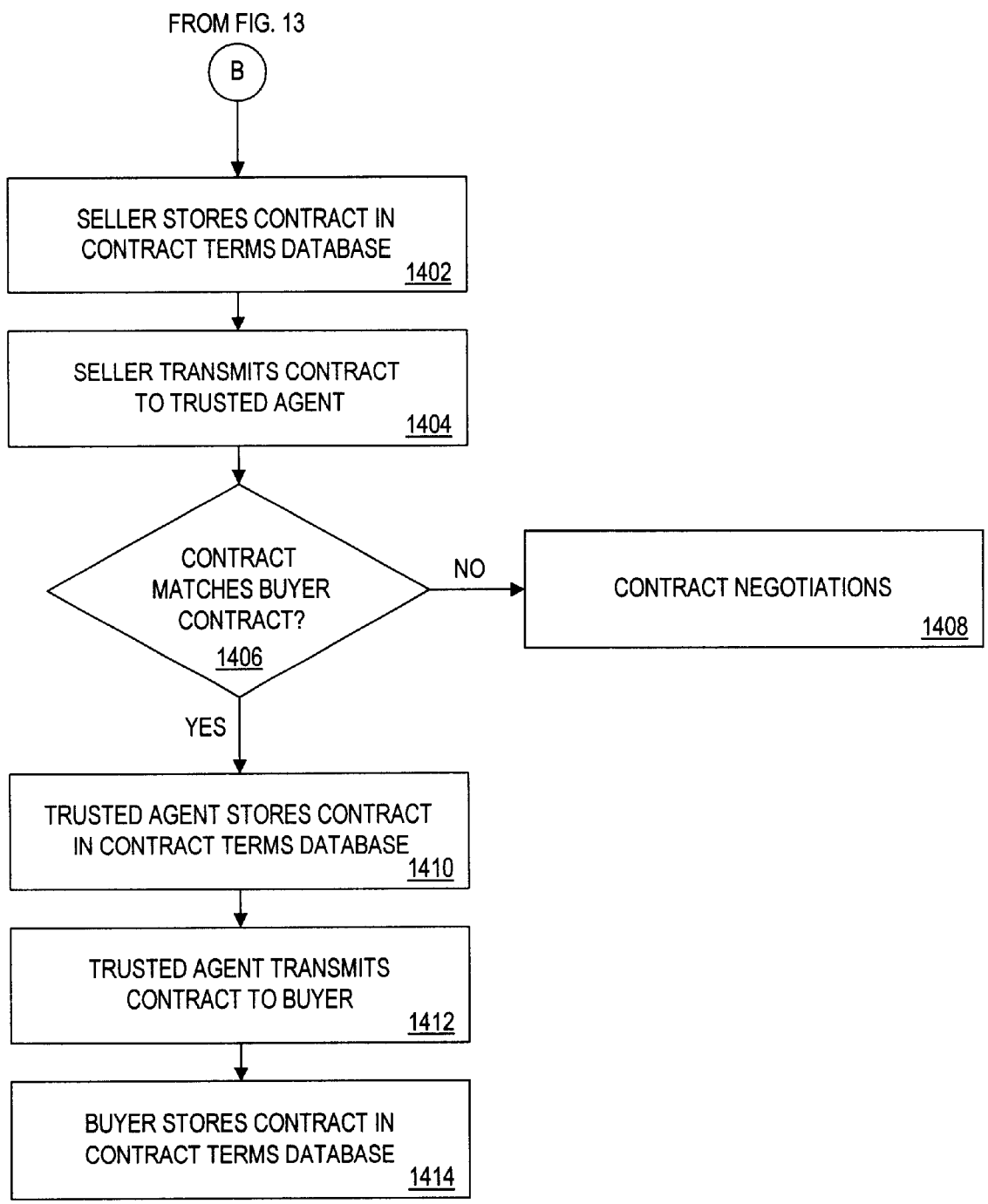
FIG. 14 is a flow diagram of additional steps of a method for accepting a contract consistent with the present invention.

FIGS. 12 through 14 are flow diagrams for a method and program for executing electronic transactions using cryptographically-enabled accounts consistent with the invention. FIG. 12 is a flow diagram showing steps relating to contract signing. A buyer, using a buyer terminal and controller as described in detail above, initiates a transaction by transmitting a proposed contract in electronic form to the seller's controller (step 1202). If the seller chooses not to accept the terms of the proposed contract (step 1204), the seller modifies the contract terms (step 1206) and returns the contract to the buyer's controller (step 1208). If the buyer accepts the contract (step 1210), he digitally signs the contract (step 1214). Otherwise, if the buyer changes the contract (step 1212), the process returns to step 1202.

A buyer generates a digital signature using, for example, cryptographic processor 420 in the buyer's controller. Cryptographic processor 420 executes cryptographic algorithms such as the algorithms specified in RSA Data Security, Inc.'s Public Key Cryptography standards or algorithms specified by ANSI X.509. Such algorithms can also include, for example, symmetric encryption function, public key encryption function, hash functions, and others known to those skilled in the art. The digital signature verifies that the buyer accepted the contract. Of course, if the seller initiates the transaction, the roles of the seller and buyer are reversed in the foregoing steps, with contract negotiation ending when the seller digitally signs the contract. The practice of using cryptographic protocols to ensure the authenticity of senders as well as the integrity of communications is well known in the art and need not be described here in detail. Any conventional cryptographic protocols such as those described in Bruce Schneier, *Applied Cryptography, Protocols, Algorithms, and Source Code In C* (2d ed. 1996), could be used in accordance with the present invention.

FIGS. 13 and 14 are flow diagrams showing steps of a method relating to the seller's acceptance and signing of the contract. Using its controller, the buyer transmits the digitally signed contract to the controller of a trusted agent (step 1302). Using cryptographic processor 420 in the trusted agent controller, the trusted agent digitally signs the contract (step 1304) and electronically transmits the contract to the seller's controller (step 1306). If the seller verifies that the terms of the contract are still valid (step 1308), the seller digitally signs the contract (step 1312); otherwise, buyer and seller return to contract negotiations (step 1310). The seller then stores the signed contract in the seller's controller contract terms database 1004 (step 1402) and transmits an electronic copy to the trusted agent's controller (step 1404). If the trusted agent's copy of the contract matches the contract received from the buyer (step 1406), the trusted agent stores the contract in contract terms database 504 (step 1410) and transmits the contract to the buyer's controller (step 1412). The buyer subsequently stores the contract in its controller's contract terms database 1004 (step 1414). If the trusted agent determines that the buyer and seller versions of the contract do not match, contract negotiations begin again (step 1408). As described above, the method of executing the contract may also be conventional paper documents.

Figure 15:
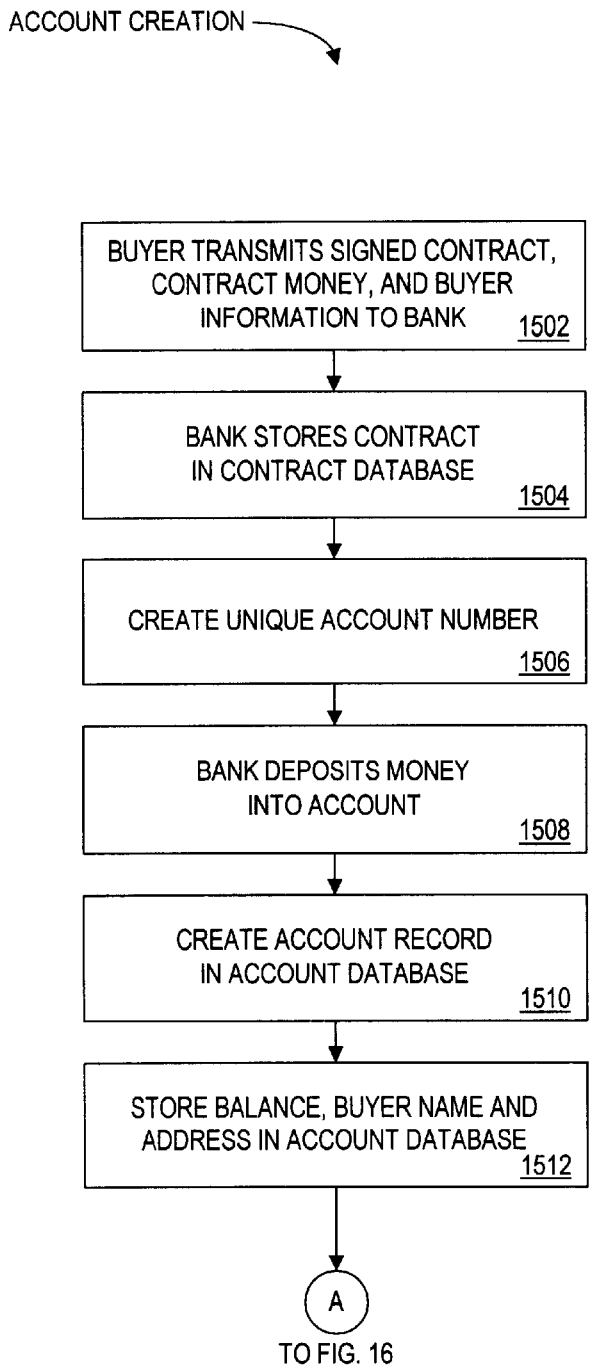
FIG. 15 is a flow diagram of one method for establishing an account consistent with the present invention.

Once both the buyer and seller have an electronic copy of a trusted agent-verified, executed contract, the parties to the transaction establish a CEA at a bank. A CEA is an account established at any financial institution where both access to and control over the funds in the account are governed by encrypted control permission certificates. FIG. 15 is a flow diagram showing one method of establishing such an account consistent with the present invention. The buyer transmits the signed contract to the bank, along with an amount of money specified by the contract, serving as a bond (step 1502). The bank stores the contract in its controller's contract terms database 804 (step 1504) and establishes a unique account number for a new CEA (step 1506). Funds deposited in a CEA (step 1508) are governed both by a formal agreement among all of the parties to the transaction called the Account Terms and Conditions ("ATAC"), which includes the terms of the contract previously negotiated and signed by the buyer and seller, and also by a set of known cryptographic protocols. These protocols govern the process by which the bank releases funds from the CEA to the seller. Because the transaction is handled electronically using digital signatures, either or both parties can be anonymous to each other and to the bank.

After digitally signing the ATAC, neither party can unilaterally modify or repudiate it. The bank creates a new record corresponding to the CEA in account database 806 (step 1510), and stores in that record information describing the account, such as balance, buyer name, and address (step 1512).

Figure 16:
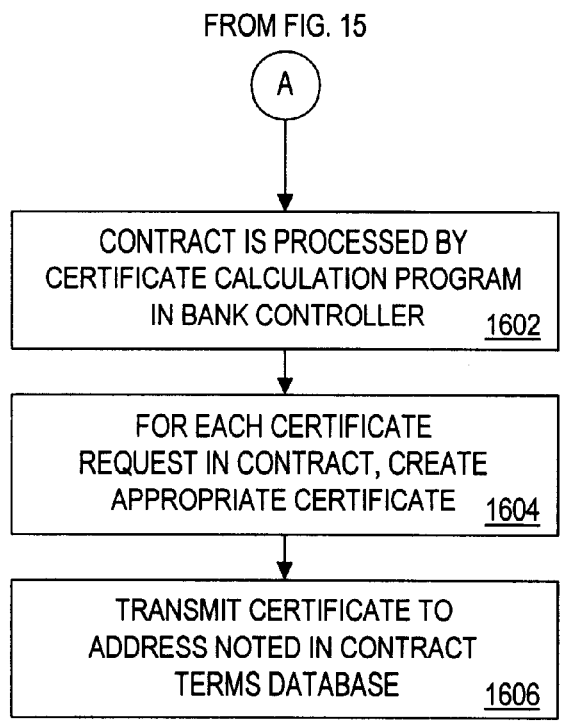
FIG. 16 is a flow diagram of one method for distributing permission certificates consistent with the present invention.

The trusted agent, mutually selected by both buyer and seller, administers the ATAC and distributes permission certificates to the CEA using its controller. The trusted agent need not have any prior relationship with the bank, buyer, or seller. Moreover, the bank can serve as the trusted agent and distribute permission certificates as shown in FIG. 16. In the permission certificate distribution example of FIG. 16, the bank uses permission certificate calculation program 808 to evaluate the elements of the contract (step 1602) and to generate a permission certificate for each permission certificate request in the contract (step 1604). It will be understood that this function is straight-forwardly performed by generating a permission certificate for each condition in the contract. Using its controller, the bank transmits each permission certificate to the controller for each facility designated in the bank's contract terms database 804. The bank places a cryptographic lock on the CEA, giving the bank ultimate control over the account. These steps are identical for a trusted agent other than the bank.

A cryptographic lock prohibits access to the CEA and is controlled by a lock permission certificate. One embodiment of such a lock permission certificate consistent with the present invention is a data file having the following format:

1) a string of data identifying the permission certificate as a "lock permission certificate";

2) a string of data uniquely identifying the corresponding CEA;

3) the public digital signature key of the person that may use the permission certificate;

4) the public digital signature key of the controlling trusted agent;

5) the public digital signature key of the trusted agent using this lock permission certificate;

6) the trusted agent's digital signature on the ATAC; and 7) the trusted agent's digital signature on the combined data of 1–6 appended to the combined data of 1–6.

The trusted agent's controller generates a lock permission certificate. Once locked, neither the buyer nor the seller can access money in the CEA until the CEA is unlocked. An unlock permission certificate has a data file format that parallels the lock permission certificate. Each party that will withdraw money from the CEA during the transaction will receive from the bank a withdrawal or partial withdrawal permission certificate that includes the public signature key of the party authorized to use it and the amount of money that its holder can withdraw. One embodiment of such a withdrawal or partial withdrawal permission certificate consistent with the present invention is a data file having the following format:

1) a string of data identifying the permission certificate as a "withdrawal or partial withdrawal permission certificate;"

2) a string of data uniquely identifying the corresponding CEA;

3) the public digital signature key of the person that can withdraw money from the CEA;

4) the public digital signature key of the controlling trusted agent;
5) the public digital signature key of the trusted agent using this withdrawal permission certificate;
6) the amount of money that the holder of this withdrawal permission certificate can withdraw;
7) the trusted agent's digital signature on the ATAC; and
8) the digital signature of the trusted agent on the combined data of items 1–7 appended to the combined data of 1–7.

The buyer, seller, or trusted agent may each have an inquiry permission certificate according to terms in the ATAC, permitting the holder to query the bank to get information on the CEA, such as verifying the total amount of funds on deposit or verifying that the amount on deposit meets or exceeds a certain amount. A deposit can be made using a deposit permission certificate that has a data file format that parallels the withdrawal permission certificate. The inquiry permission certificate also allows the parties to review the terms and restrictions in an authenticated version of the ATAC. One embodiment of such an inquiry permission certificate consistent with the present invention is a data file having the following format:

1) a string of data identifying the permission certificate as an "inquiry permission certificate;"
2) a string of data uniquely identifying the corresponding CEA;
3) the public digital signature key of the person that may use the permission certificate;
4) the public digital signature key of the controlling trusted agent;
5) the public digital signature key of the trusted agent using this inquiry permission certificate;
6) the trusted agent's digital signature on the ATAC; and
7) the digital signature of the trusted agent on the combined data of items 1–6 appended to the combined data of items 1–6.

A CEA preferably has a finite lifetime dictated by the ATAC. Therefore, if the trusted agent does not transmit to the seller a withdrawal permission certificate enabling the seller to withdraw the money in the CEA before the expiration date of the account, the buyer may use an expire key to close the CEA and withdraw the deposited money. One embodiment of an expire permission certificate consistent with the present invention is a data file having the following format:

1) a string of data identifying the permission certificate as an "expire permission certificate;"
2) a string of data uniquely identifying the corresponding CEA;
3) the public digital signature key of the person that may use the expire permission certificate;
4) the public digital signature key of the controlling trusted agent;
5) the public digital signature key of the trusted agent using this expire permission certificate;
6) the trusted agent's digital signature on the ATAC;
7) the amount of money that can be withdrawn;
8) a time stamp indicating the earliest date that the money can be withdrawn; and
9) the trusted agent's digital signature on the combined data of items 1–8 appended to the combined data of items 1–8.

Figure 17:
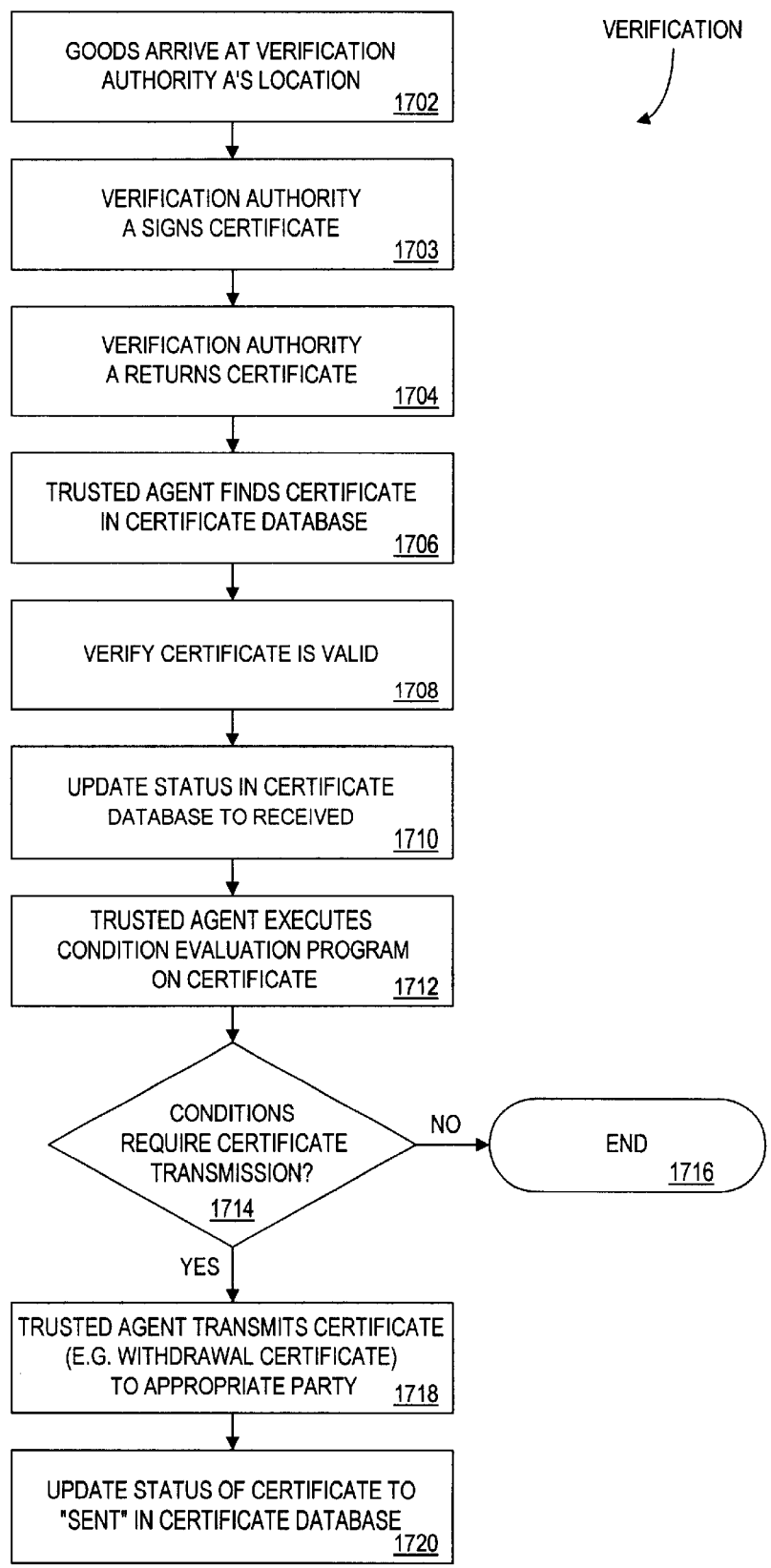
FIG. 17 is a flow diagram of one method for verifying permission certificates consistent with the present invention.

FIG. 17 is a flow diagram of a process for verifying performance of the contract. When appropriate, the parties to the transaction designate a verification authority who serves as an independent auditing authority to assure the trusted agent monitoring the transaction that the parties have met the conditions of the agreement, for example, the delivery of goods to a verification authority (step 1702). The verification authority then signs its verification authority permission certificate (step 1703). According to the terms of the ATAC, the trusted agent distributes verification authority permission certificates to designated verification authorities who store these permission certificates in permission certificate database 1130 of verification authority controller 1106. Using, preferably, verification authority controller 1106, a verification authority returns the verification authority permission certificate after verifying that the seller has performed the conditions of the contract (step 1704). One embodiment of such a verification authority permission certificate consistent with the present invention is a data file having the following format:

1) a string of data identifying the permission certificate as a "verification authority permission certificate;"
2) a string of data uniquely identifying the corresponding CEA;
3) the public digital signature key of the person that may use the permission certificate;
4) the public digital signature key of the controlling trusted agent;
5) the public digital signature key of the trusted agent using this verification authority permission certificate;
6) the trusted agent's digital signature on the ATAC; and
7) the trusted agent's digital signature on the combined data of items 1–6 appended to the combined data of items 1–6.

The trusted agent searches trusted agent permission certificate database 506 (step 1706), verifies that the permission certificate is valid (step 1708), and updates the status for the delivery confirmation permission certificate in the permission certificate database to "received" (step 1710). The trusted agent then executes condition evaluation program 508 on the received permission certificate (step 1712) to determine if the trusted authority must now send a withdrawal permission certificate to the party designated in the ATAC (step 1714). If so, the trusted agent sends the withdrawal permission certificate (step 1718) and updates the status for this permission certificate in trusted agent permission certificate database 506 to "sent" (step 1720). Otherwise, if the trusted agent condition evaluation program determines that the trusted agent should not send a withdrawal permission certificate, the verification process ends (step 1716). The withdrawal permission certificate is just one example of the types of permission certificates used in such a transaction. Other transactions may involve, for example, partial withdrawal or verification authority permission certificates.

Figure 18:
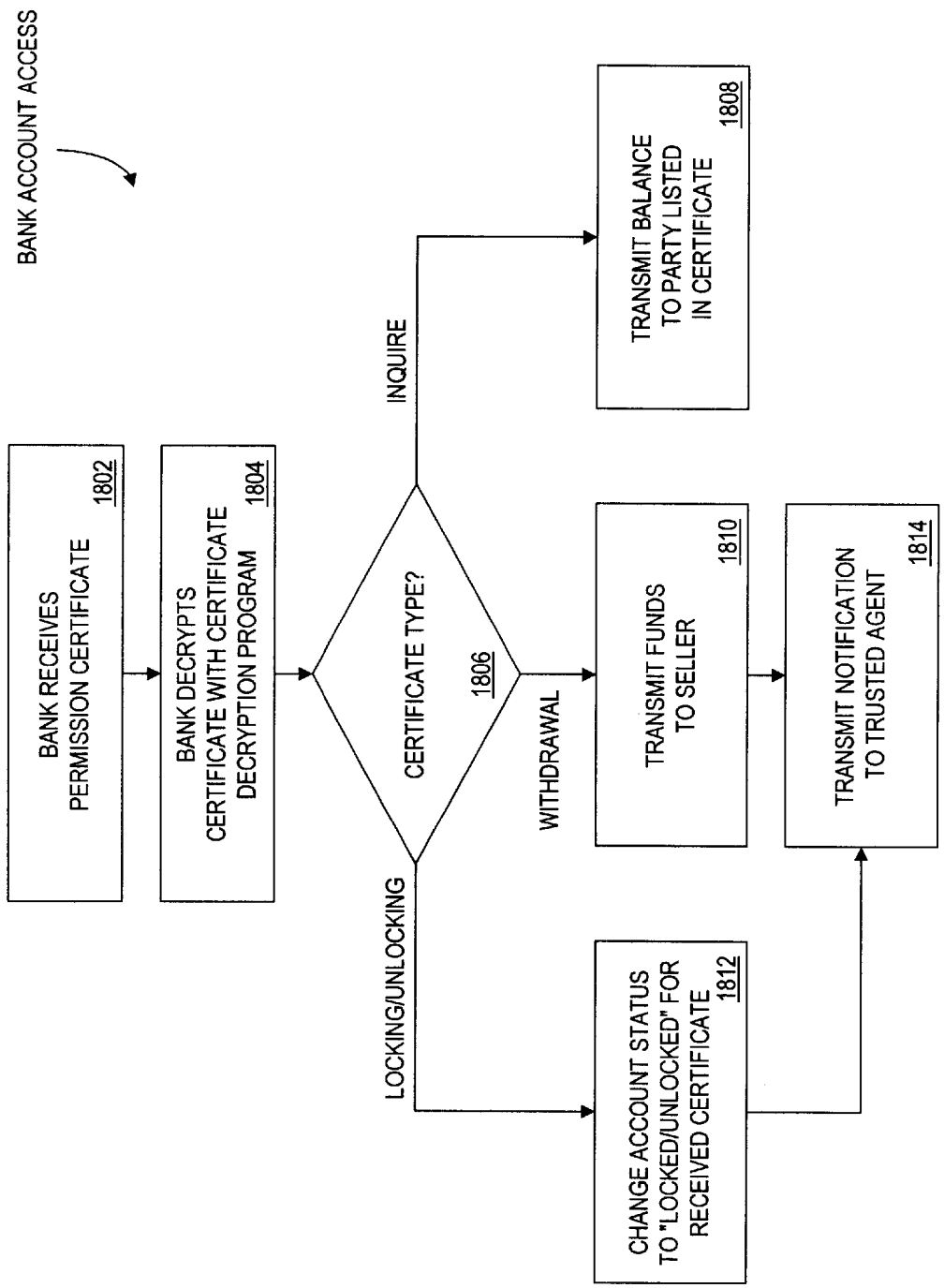
FIG. 18 is a flow diagram of one method for account access consistent with the present invention.

FIG. 18 is a flow diagram of the steps for accessing the CEA. The bank controller receives a permission certificate from one of the parties to the transaction (step 1802) and decrypts it using permission certificate decryption program 810 (step 1804). Depending on the permission certificate type (step 1806), the bank controller takes certain actions. For example, if the permission certificate is a lock or unlock permission certificate, the bank either locks or unlocks the CEA (step 1812). A withdrawal permission certificate causes the bank to transmit funds to the party designated in the contract (step 1810). After processing unlock, lock, and withdrawal permission certificates, the bank transmits notification of the action to the trusted agent. When responding to an inquire permission certificate, the bank transmits notification of the CEA balance to the party identified by the permission certificate (step 1808).

While this description illustrates and describes certain preferred embodiments and methods consistent with the present invention, persons skilled in the art will understand that various changes and modifications may be made, and equivalents may be substituted without departing from the scope of the invention. For example, other terminals, databases, and encryption may be used. And, if a facility provides appropriate security measures, the facility can accommodate controllers capable of serving multiple roles.

In addition, many modifications may be made to adapt a particular element, technique or implementation to the teachings of the present invention without departing from the central scope of the invention. Therefore, this invention is not limited to the particular embodiments and methods disclosed, but includes all embodiments falling within the scope of the appended claims.

We claim:

1. A method for executing an electronic transaction, comprising:

transmitting a verification authority permission certificate from a trusted agent to a verification authority;

signing the transmitted verification authority permission certificate;

transmitting the signed verification authority permission certificate from the verification authority to the trusted agent to verify that a seller has performed conditions of a contract;

transmitting a withdrawal permission certificate from the trusted agent to the seller in response to receipt of the signed verification authority permission certificate;

transmitting the withdrawal permission certificate from the seller to a bank; and transmitting funds from the bank to the seller in response to the bank receiving the withdrawal certificate.

* * * * *